(12) United States Patent
Chao et al.

(10) Patent No.: US 12,450,103 B2
(45) Date of Patent: Oct. 21, 2025

(54) DISTRIBUTED AND CONCURRENT MULTI-CLOUD ORCHESTRATION MANAGEMENT

(71) Applicant: Dell Products L.P., Round Rock, TX (US)

(72) Inventors: Ching-Yun Chao, Austin, TX (US); Joseph White, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 481 days.

(21) Appl. No.: 18/149,455

(22) Filed: Jan. 3, 2023

(65) Prior Publication Data
US 2024/0220333 A1    Jul. 4, 2024

(51) Int. Cl.
*G06F 9/50* (2006.01)

(52) U.S. Cl.
CPC .................. *G06F 9/5083* (2013.01)

(58) Field of Classification Search
CPC .......................... G06F 9/5083; G06F 9/5072
See application file for complete search history.

(56) References Cited

U.S. PATENT DOCUMENTS

| 2020/0036647 A1* | 1/2020 | Gupta | H04L 67/10 |
| 2020/0050694 A1* | 2/2020 | Avalani | G06F 16/25 |
| 2022/0138014 A1* | 5/2022 | Maturi | G06F 9/44505 |
| | | | 709/226 |
| 2023/0156074 A1* | 5/2023 | Kim | H04L 12/4633 |
| | | | 709/201 |
| 2024/0012664 A1* | 1/2024 | Luo | H04L 41/0893 |
| 2024/0095069 A1* | 3/2024 | Gao | G06F 9/4881 |

OTHER PUBLICATIONS

Xiangguang, Basic Concepts and Intuitive Understanding of EPaxos, Commuinty, Blog, Jan. 28, 2021, 10 pgs.
Ongaroe et al., In Search of an Understandable Consensus Algorithm (Extended Version), Stanford University, 18 pgs.
(Continued)

*Primary Examiner* — Sisley N Kim
(74) *Attorney, Agent, or Firm* — Amin, Turocy & Watson, LLP

(57) ABSTRACT

A system can receive a request from a client to perform a job via a multi-cloud platform at a leader management node. The system can, based on receiving the request, send respective first inquiries to respective management nodes of a group of management nodes, wherein the respective first inquiries inquire about respective available processing resources of the respective cloud platforms to perform the job. The system can, based on receiving respective responses from the respective management nodes, determine a first proposal for reservation of computing resources for the request among the respective cloud platforms. The system can select a subgroup leader node from the group of management nodes, wherein the subgroup leader node is configured to perform a commit operation for the reservation of the computing resources in parallel with the leader management node sending respective second inquiries to the respective management nodes and determining a second proposal.

20 Claims, 12 Drawing Sheets

(56) References Cited

OTHER PUBLICATIONS

Ongaroe et al., In Search of an Understandable Consensus Algorithm, https://www.usenix.org/conference/atc14/technical-sessions/presentation/ongaro, Usenix the Advanced Computing Systems Association, Jun. 19-20, 2014, 16 pgs.

Xiangguang, Paxos, Raft, EPaxos: How Has Distributed Consensus Technology Evolved?, Commuinty, Blog, Jan. 11, 2021, 15 pgs.

Hooda, Raft Consensus Algorithm, GeeksforGeeks, Aug. 3, 2022, 13 pgs.

Lamport, The Part-Time Parliament, ACM Transactions on Computer Systems 16, 2 (May 1998), 133-169, 33 pgs.

Moraru et al., There Is More Consensus in Egalitarian Parliaments, http://dx.doi.org/10.1145/2517349.2517350, SOSP'13, Nov. 3-6, 2013, Farmington, Pennsylvania, USA, 15 pgs.

Ongaroe et al., "In Search of an Understandable Consensus Algorithm (Extended Version)", May 2014, Stanford University, 18 pgs.

\* cited by examiner

700

702

RECEIVING A REQUEST FROM A CLIENT TO PERFORM A JOB VIA A MULTI-CLOUD PLATFORM AT A LEADER MANAGEMENT NODE THAT IS CONFIGURED TO CREATE PROPOSALS FOR ALLOCATION OF COMPUTING RESOURCES VIA THE MULTI-CLOUD PLATFORM 704

BASED ON RECEIVING THE REQUEST, SENDING RESPECTIVE FIRST INQUIRIES TO RESPECTIVE MANAGEMENT NODES OF A GROUP OF MANAGEMENT NODES, WHERE THE RESPECTIVE MANAGEMENT NODES ARE CONFIGURED TO MANAGE RESPECTIVE CLOUD PLATFORMS OF THE MULTI-CLOUD PLATFORM, WHERE THE RESPECTIVE FIRST INQUIRIES INQUIRE ABOUT RESPECTIVE AVAILABLE PROCESSING RESOURCES OF THE RESPECTIVE CLOUD PLATFORMS TO PERFORM THE JOB 706

BASED ON RECEIVING RESPECTIVE RESPONSES FROM THE RESPECTIVE MANAGEMENT NODES, DETERMINING A FIRST PROPOSAL FOR RESERVATION OF COMPUTING RESOURCES FOR THE REQUEST AMONG THE RESPECTIVE CLOUD PLATFORMS 708

SELECTING A SUBGROUP LEADER NODE FROM THE GROUP OF MANAGEMENT NODES, WHERE THE SUBGROUP LEADER NODE IS CONFIGURED TO PERFORM A COMMIT OPERATION FOR THE RESERVATION OF THE COMPUTING RESOURCES IN PARALLEL WITH THE LEADER MANAGEMENT NODE SENDING RESPECTIVE SECOND INQUIRIES TO THE RESPECTIVE MANAGEMENT NODES AND DETERMINING A SECOND PROPOSAL 710

712

RECEIVING A REQUEST FROM A CLIENT TO PERFORM A TASK 804

↓

BASED ON RECEIVING THE REQUEST, SENDING RESPECTIVE FIRST INQUIRIES TO RESPECTIVE MANAGEMENT NODES OF A GROUP OF MANAGEMENT NODES, WHERE THE RESPECTIVE FIRST INQUIRIES INQUIRE ABOUT RESPECTIVE AVAILABLE PROCESSING RESOURCES OF RESPECTIVE CLOUD PLATFORMS OF A MULTI-CLOUD PLATFORM TO PERFORM THE TASK 806

↓

BASED ON RECEIVING RESPECTIVE RESPONSES FROM THE RESPECTIVE MANAGEMENT NODES, DETERMINING A FIRST PROPOSAL FOR RESERVATION OF COMPUTING RESOURCES FOR THE REQUEST AMONG THE RESPECTIVE CLOUD PLATFORMS 808

↓

SELECTING A SUBGROUP LEADER NODE FROM THE GROUP OF MANAGEMENT NODES, WHERE THE SUBGROUP LEADER NODE IS CONFIGURED TO PERFORM A COMMIT OPERATION FOR THE RESERVATION OF THE COMPUTING RESOURCES IN PARALLEL WITH THE SYSTEM SENDING RESPECTIVE SECOND INQUIRIES TO THE RESPECTIVE MANAGEMENT NODES AND DETERMINING A SECOND PROPOSAL 810

RECEIVING A SECOND REQUEST TO PERFORM A SECOND TASK, WHERE THE SECOND REQUEST IS RECEIVED BEFORE THE SUBGROUP LEADER BEGINS TO PERFORM THE COMMIT OPERATION 904

SENDING THE RESPECTIVE SECOND INQUIRIES AFTER THE SUBGROUP LEADER BEGINS TO PERFORM THE COMMIT OPERATION, WHERE THE SECOND REQUEST CORRESPONDS TO THE RESPECTIVE SECOND INQUIRIES 906

DISTRIBUTED AND CONCURRENT MULTI-CLOUD ORCHESTRATION MANAGEMENT

BACKGROUND

Cloud computing platforms can provide processing and storage resources to users. Users can use resources from multiple separate cloud computing platforms.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can receive a request from a client to perform a job via a multi-cloud platform at a leader management node that is configured to create proposals for allocation of computing resources via the multi-cloud platform. The system can, based on receiving the request, send respective first inquiries to respective management nodes of a group of management nodes, wherein the respective management nodes are configured to manage respective cloud platforms of the multi-cloud platform, wherein the respective first inquiries inquire about respective available processing resources of the respective cloud platforms to perform the job. The system can, based on receiving respective responses from the respective management nodes, determine a first proposal for reservation of computing resources for the request among the respective cloud platforms. The system can select a subgroup leader node from the group of management nodes, wherein the subgroup leader node is configured to perform a commit operation for the reservation of the computing resources in parallel with the leader management node sending respective second inquiries to the respective management nodes and determining a second proposal.

An example method can comprise receiving, by a system comprising a processor, a request from a client to perform a task. The method can further comprise, based on receiving the request, sending, by the system, respective first inquiries to respective management nodes of a group of management nodes, wherein the respective first inquiries inquire about respective available processing resources of respective cloud platforms of a multi-cloud platform to perform the task. The method can further comprise, based on receiving respective responses from the respective management nodes, determining, by the system, a first proposal for reservation of computing resources for the request among the respective cloud platforms. The method can further comprise, selecting, by the system, a subgroup leader node from the group of management nodes, wherein the subgroup leader node is configured to perform a commit operation for the reservation of the computing resources in parallel with the system sending respective second inquiries to the respective management nodes and determining a second proposal.

An example non-transitory computer-readable medium can comprise instructions that, in response to execution, cause a system comprising a processor to perform operations. These operations can comprise receiving a request from a client for performance of a task on a multi-cloud platform. These operations can further comprise, based on receiving the request, sending respective first inquiries to respective management nodes of a group of management nodes, wherein the respective first inquiries inquire about respective available processing resources of respective cloud platforms of the multi-cloud platform with respect to the performance of the task. These operations can further comprise, based on receiving respective responses from the respective management nodes, determining a proposal for reservation of computing resources for the request among the respective cloud platforms. These operations can further comprise selecting a subgroup leader node from the group of management nodes, wherein the subgroup leader node is configured to perform a commit operation for the reservation of the computing resources in parallel with the system sending respective second inquiries to the respective management nodes.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 7 illustrates an example process flow that can facilitate distributed and concurrent multi-cloud orchestration management, in accordance with an embodiment of this disclosure:

FIG. 8 illustrates another example process flow that can facilitate distributed and concurrent multi-cloud orchestration management, in accordance with an embodiment of this disclosure:

FIG. 9 illustrates another example process flow that can facilitate distributed and concurrent multi-cloud orchestration management, in accordance with an embodiment of this disclosure:

DETAILED DESCRIPTION

Overview

Figure 1:
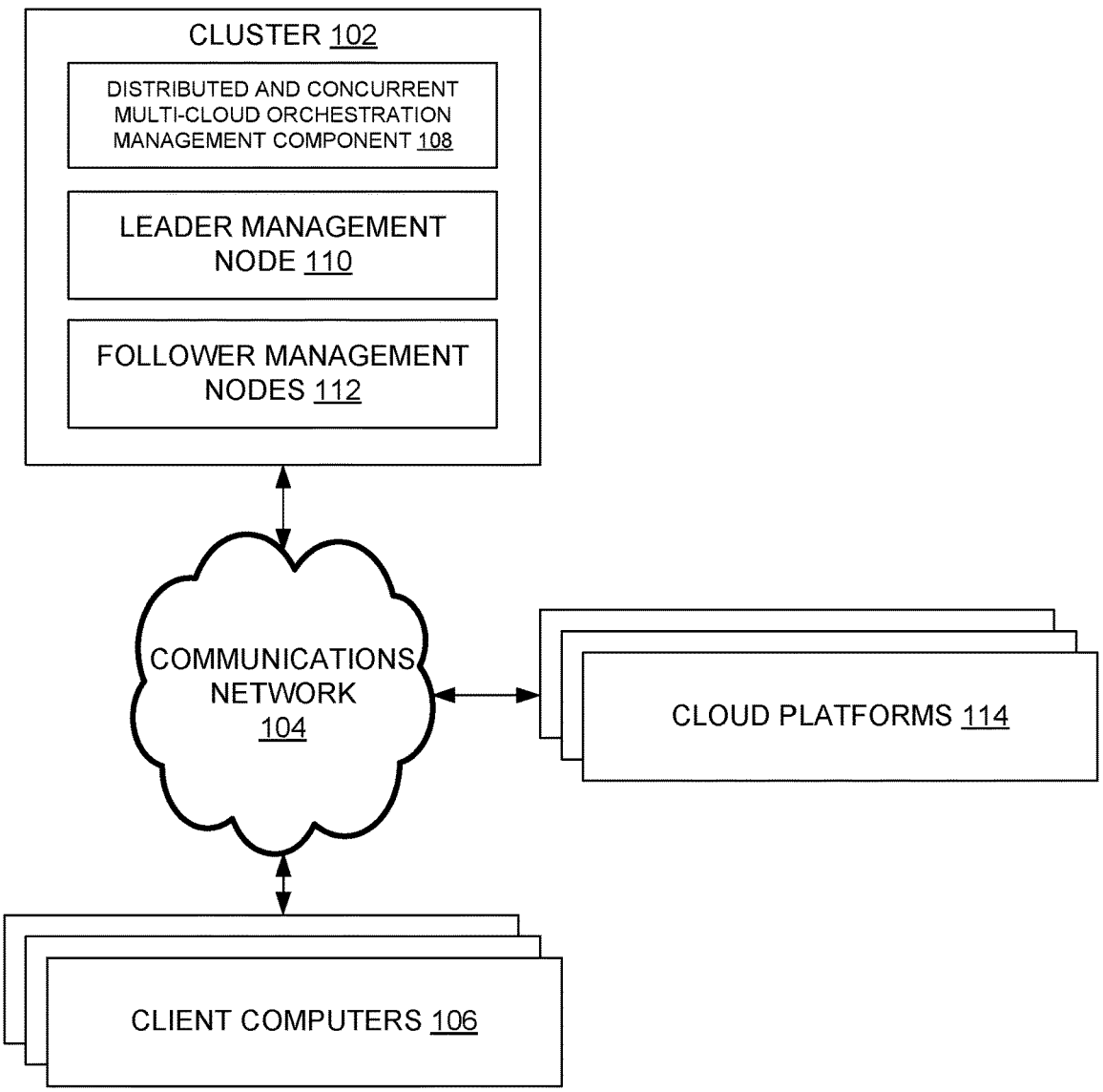
FIG. 1 illustrates an example system architecture that can facilitate distributed and concurrent multi-cloud orchestration management, in accordance with an embodiment of this disclosure.

While the examples herein generally describe a multi-cloud scenario, it can be appreciated that the present techniques can be applied to other architectures where resources are allocated across multiple systems. For example, the present techniques can be applied to hybrid cloud architectures where on-premises hardware operates in conjunction with one or more cloud platforms.

A problem with multi-cloud management can be that it is difficult to keep a multi-cloud infrastructure healthy, which can include balancing workload performance and operation cost optimization across multiple clouds. A solution to this problem can involve building an efficient-and-reliable system to maintain a consistent configuration and state information across clouds, and to perform resource utilization and cost-reduction optimization.

Some prior approaches incorporate a centralized management protocol. It can be that prior centralized approaches are not truly centralized when considering fault tolerance and high availability (which can lead to multiple management systems). These centralized approaches can generally create replicas and add redundant servers to achieve high availability.

Some prior approaches incorporate a distributed management protocol. A distributed management protocol can scale horizontally, and can use a distributed consensus protocol to achieve consistent state where a majority of management servers are available.

There can be different implementations of a consensus protocol, such as a Raft approach and a Paxos approach. A Raft approach can generally be a simpler version of a Paxos approach (where Paxos can refer to a family of consensus protocols). Relative to a Paxos approach, a Raft approach can be modular and easier to understand, with comparable performance history. In some examples, an Egalitarian Paxos ("EPaxos") approach can provide better theoretical parallelism and higher throughput than a Raft approach or a Paxos approach. However, it can be that an EPaxos approach is more difficult to understand than a Raft approach, while also having many challenges in implementation, so is not suitable for practical application.

Some examples according to the present techniques can facilitate a multi-cloud orchestration management protocol that leverages a Raft approach. A Raft approach can be less complex and easier to understand and implement as compared with a Paxos family of approaches. Being easier to understand can be a consideration when building complex systems. An easier-to-understand approach can help in minimizing development and operation errors and maintenance effort.

It can also be desirable to achieve better parallelism and throughput through concurrent processing as in a Paxos family of approaches. It can be that multi-cloud management usage scenarios have unique operation patterns, and this is discussed below. The present techniques can be implemented to take unique patterns into consideration to explore concurrent processing for better parallelism and throughput performance. It can be appreciated that, while the present techniques are generally described with respect to multi-cloud orchestration management, the present techniques can be applied to other areas with similar operating patterns.

As used herein, "multi-cloud" can include hybrid cloud variations of a multi-cloud architecture.

According to the present techniques, concurrent processing can be facilitated because certain multi-cloud orchestration management patterns can be processed in parallel.

The present techniques can be implemented in a manner that incorporates two approaches: a high-level inquire-propose-commit-respond four-phase consensus protocol, and a concurrent commit phase approach.

An inquire-propose-commit-respond four-phase consensus protocol and a multi-cloud orchestration management solution according to the present techniques can offer the following advantages An inquire-propose-commit-respond four-phase consensus protocol can support concurrent processing in the commit phase. The approach can be based on a Raft approach, while offering concurrency that a Raft approach lacks.

This approach can be used for multi-cloud orchestration management. Management nodes form a cluster which use this distribute approach to manage consistent state. The approach can be applied to other areas that have similar usage scenarios.

In an Inquire phase, a leader node can request configuration and state information from all management nodes with respect to the request. After formulating an optimal solution (or a solution that satisfies an optimality criterion) with the data, the leader in Propose phase can send the proposal to all management nodes specified in the optimal solution to reserve required resources and for all management nodes for agreement.

The Inquire phase can allow the leader management node to determine a globally optimal solution.

The Propose phase can allow the leader management node to ensure that all required resources are reserved. This can help avoid deadlock situation caused by resource contention.

In some examples, concurrency in the commit phase can be achieved by forming a subgroup of only those management nodes that are specified in the optimal solution. The subgroup of management nodes can run the same approach to manage consistent subgroup state with a single purpose to complete the Commit phase. The subgroup can be disassembled upon completion of the Commit phase.

The cluster leader can assign a leader node when forming a subgroup for optimal efficiency. This can be possible where the leader node knows the exact node status at the end of the Propose phase.

A commit phase protocol can involve only a subset of management nodes and therefore reduce the number of messages to be transmitted.

Adding a concurrent commit phase can allow concurrent commit phases, along with Inquire phase and Propose phase protocols which adds parallelism to the Raft Consensus protocols and help balance the workload among management nodes.

Resource contention can be determined in an Inquire phase and the requesting processing can complete in a single phase. Commit status update from subgroup to the cluster can be handled by a single Propose phase. Maximum concurrency can be achieved through optimistic resource reservation in the Inquire phase. Implementations of the protocol and approach according to the present techniques can avoid deadlock condition.

Example Architectures

FIG. 1 illustrates an example system architecture 100 that can facilitate distributed and concurrent multi-cloud orchestration management, in accordance with an embodiment of this disclosure.

System architecture 100 comprises cluster 102, communications network 104, client computers 106, and cloud platforms 114. In turn, cluster 102 comprises distributed and concurrent multi-cloud orchestration management component 108, leader management node 110, and follower management nodes 112.

A computing cluster (e.g., cluster 102) can generally comprise a group of computers that work in concert and can logically be viewed as a single system. A computing cluster can comprise computing devices that can be referred to as nodes, and that can each be configured to perform a same task.

Leader management node 110 can comprise a node of cluster 102 that is configured to initiate resource-allocation operations among the nodes of cluster 102 (including follower management nodes 112). Follower management nodes 112 can each be configured to manage resource allocation for one or more cloud platform of clout platforms 114. Respective cloud platforms of cloud platforms 114 can each provide on-demand access to computing resources via communications network 104.

Figure 12:
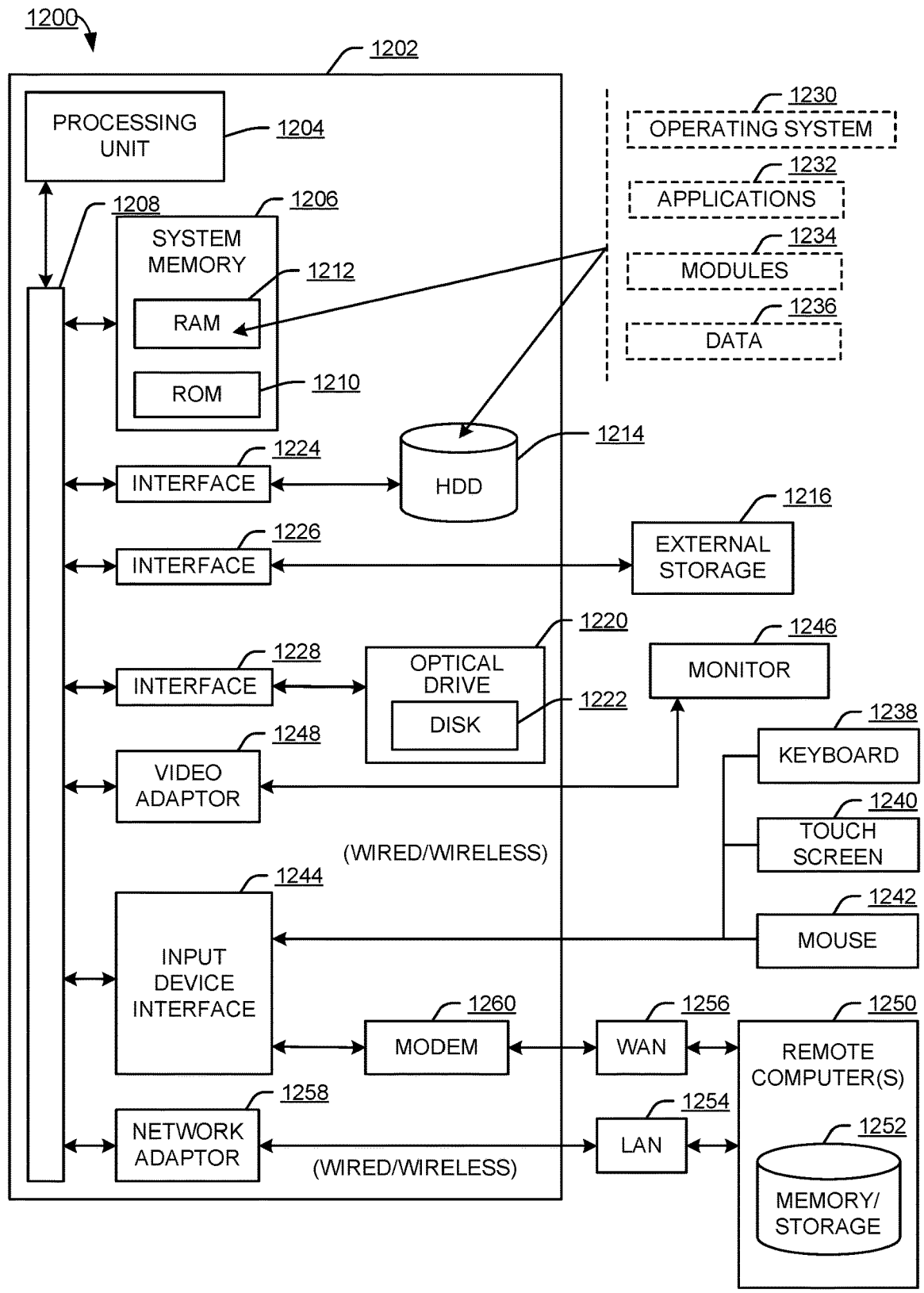
FIG. 12 illustrates an example block diagram of a computer operable to execute an embodiment of this disclosure.

Each of cluster 102, client computers 106, and/or cloud platforms 114 can be implemented with part(s) of computing environment 1200 of FIG. 12. Communications network 104 can comprise a computer communications network, such as the Internet.

Distributed and concurrent multi-cloud orchestration management component 108 can receive a request from a client computer of client computers 106 to perform a task via communications network 104. This task can involve accessing computing resources of cloud platforms 114.

Distributed and concurrent multi-cloud orchestration management component 108 can process this request to assign parts of it among various cloud platforms of cloud platforms 114.

In some examples, distributed and concurrent multi-cloud orchestration management component 108 can implement part(s) of the process flows of FIGS. 7-11 to implement distributed and concurrent multi-cloud orchestration management.

It can be appreciated that system architecture 100 is one example system architecture for distributed and concurrent multi-cloud orchestration management, and that there can be other system architectures that facilitate distributed and concurrent multi-cloud orchestration management.

Figure 2:
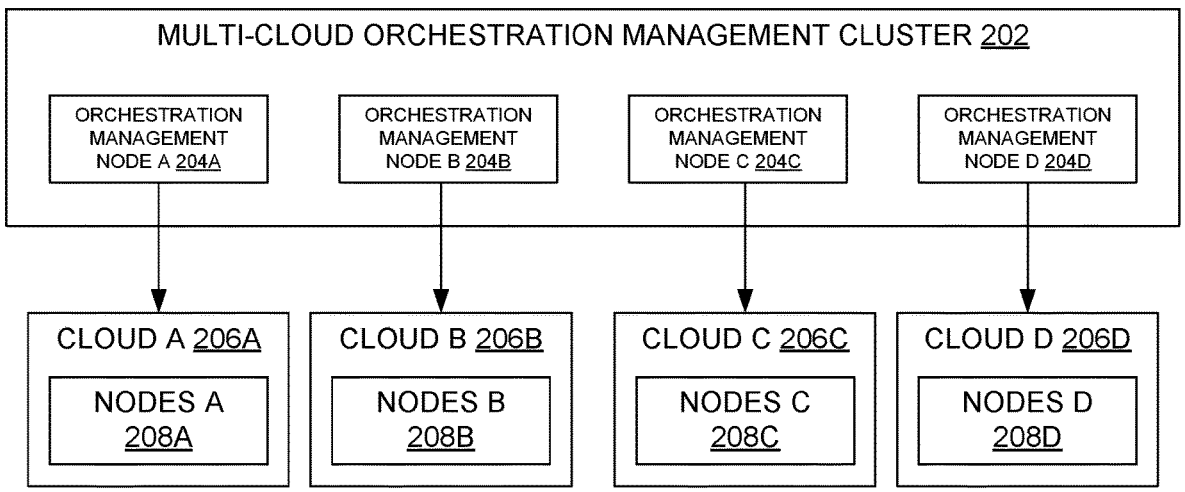
FIG. 2 illustrates another example system architecture that can facilitate distributed and concurrent multi-cloud orchestration management, in accordance with an embodiment of this disclosure.

FIG. 2 illustrates another example system architecture 200 that can facilitate distributed and concurrent multi-cloud orchestration management, in accordance with an embodiment of this disclosure. In some examples, part(s) of system architecture 200 can be used to implement part(s) of system architecture 100 of FIG. 1.

System architecture 200 comprises multi-cloud orchestration management cluster 202, orchestration management node A 204A, orchestration management node B 204B, orchestration management node C 204C, orchestration management node D 204D, cloud A 206A (which comprises nodes 208A), cloud B 206B (which comprises nodes 208B), cloud C 206C (which comprises nodes 208C), and cloud D 206D (which comprises nodes 208D). Each of these parts of system architecture 200 can be implemented with part(s) of computing environment 1200 of FIG. 12.

Multi-cloud orchestration management cluster 202 can be similar to cluster 102 of FIG. 1: each of orchestration management node A 204A, orchestration management node B 204B, orchestration management node C 204C, and orchestration management node D 204D can be similar to leader management node 110, and/or a node of follower management nodes 112: and each of cloud A 206A, cloud B 206B, cloud C 206C, and cloud D 206D can be similar to a cloud platform of cloud platforms 114.

Consider an example of a multi-cloud management system that employs a cluster of distributed orchestration management nodes (e.g., multi-cloud orchestration management cluster 202) to manage multi-cloud infrastructure lifecycle management. In this example (and to simplify the example), there is one orchestration management node per cloud (e.g., orchestration management node A 204A manages cloud A 206A). Note that, in general, a relationship between orchestration management nodes and clouds can be many-to-many. Each orchestration management node can be responsible for managing all nodes in a cloud. A node can be a basic unit of management, which can be a compute node, a storage node, a network node, an operating system (OS) node, an application node, etc. In this example, "management cluster" can be used to refer the cluster of orchestration management nodes.

In fleet management usage scenarios, nodes that fit certain conditions can be used to perform the proposed action(s). For example, it can be that compute nodes of a specified model whose firmware level falls into the specified range are to update to the specified firmware level. Once all orchestration management nodes reach consensus, they can proceed concurrently to update nodes in their designated clouds.

In workload rebalancing usage scenarios, there can be an example workload that currently runs in cloud A 206A on multiple nodes of nodes 208A. There can be a desire to rebalance the workload across all clouds (e.g., cloud B 206B) for better operation characteristics. Once all orchestration management nodes reach consensus on where to host the workload, they can proceed in parallel to start or stop workload in their designated clouds.

In upgrade usage scenarios, there can be an example of N virtual machine nodes in cloud A 206A. With increasing loads, there can be a desire to double the number of nodes. First, it can be determined where to place new virtual machine nodes in the multi-cloud. This decision can depend on many factors, like which cloud has capacity, a location of each cloud with respect to the expected client locations, power efficiency, unit cost, etc. Once a consensus is reached, orchestration management nodes can add their share of the new virtual machine nodes to their designated cloud in parallel.

These are example usage scenarios, and it can be appreciated that there can be others.

In an orchestration management cluster, one orchestration management node can be elected as a leader with a limited time lease (e.g., similar to leader management node 110 of FIG. 1). Then, other orchestration management nodes can be followers (e.g., similar to follower management nodes 112 of FIG. 1). In some examples, such as with a Raft approach, it can be that only the leader is allowed to make proposals. The upgrade and workload-rebalancing examples described herein can be used to illustrate a four-phase consensus protocol.

Example Signal Flows

Figure 3:
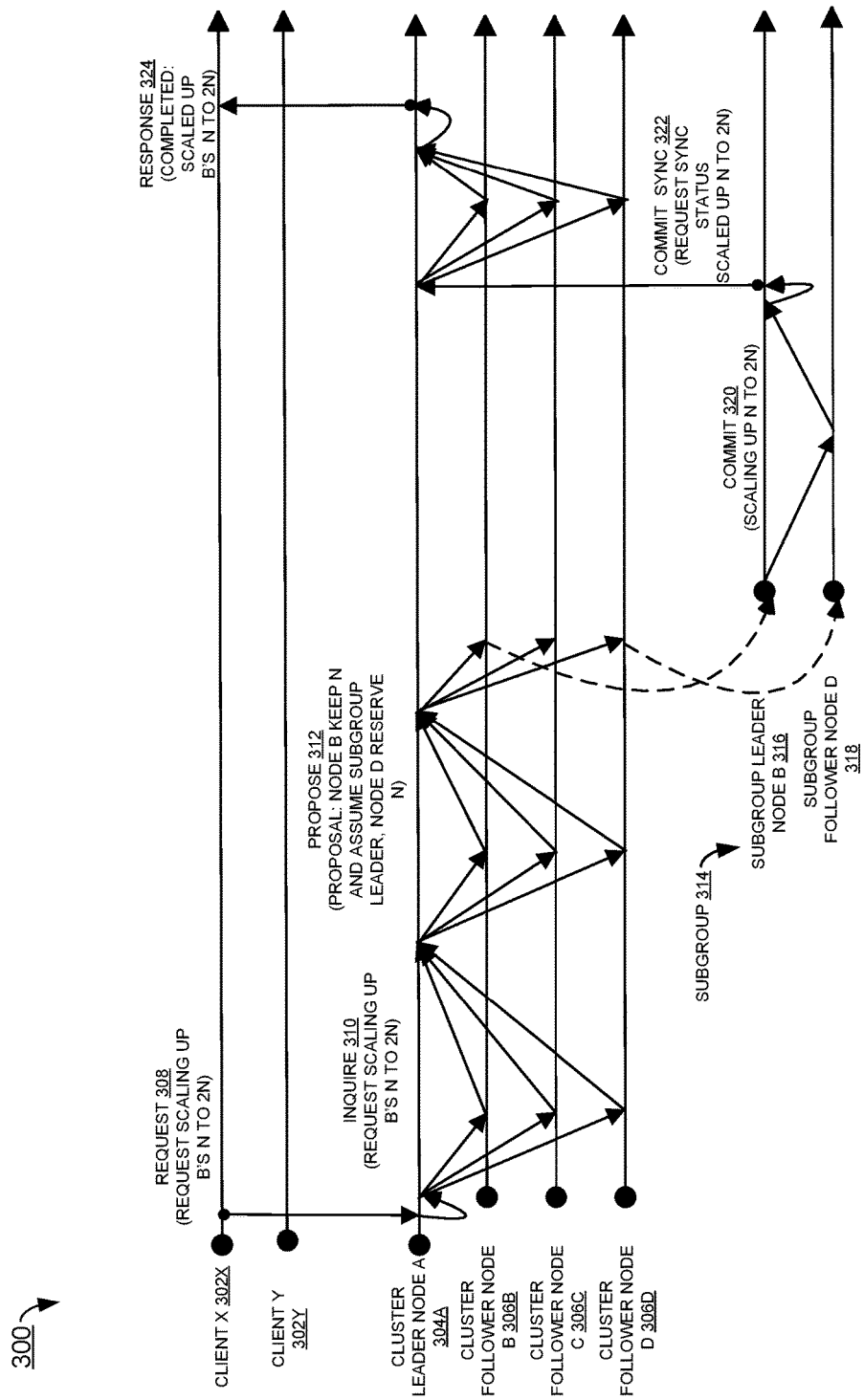
FIG. 3 illustrates an example signal flow that can facilitate distributed and concurrent multi-cloud orchestration management, in accordance with an embodiment of this disclosure.

FIG. 3 illustrates an example signal flow 300 that can facilitate distributed and concurrent multi-cloud orchestration management, in accordance with an embodiment of this disclosure. In some examples, signal flow 300 can be implemented by client computers 106, distributed and concurrent multi-cloud orchestration management component 108, leader management node 110, and/or follower management nodes 112 to facilitate distributed and concurrent multi-cloud orchestration management.

The signals of signal flow 300 can be sent between client X 302X and client Y 302Y (each of which can be similar to a client computer of client computers 106 of FIG. 1); cluster leader node A 304A (which can be similar to leader management node 110); and cluster follower node B 306B, cluster follower node C 306C, and cluster follower node D 306D (each of which can be similar to a follower management node of follower management nodes 112).

Signal flow 300 illustrates an inquire-propose-commit-respond four-phase consensus protocol with an upgrade scenario. Like with a Raft approach, the leader node can have a term lease. Leader election is omitted here to focus on the Inquire-Propose-Commit approach. In this example, a client X sends request 308 to the management cluster leader node A 304A. The request is to scale up a deployment of N nodes of cluster follower node B 306B to 2N nodes. To handle this request, cluster leader node A 304A starts an inquire-propose-commit-respond four-phase consensus protocol.

In an Inquire phase 310, the leader orchestration management node, cluster leader node A 304A, can ask for inputs from all orchestration management nodes to determine if there is sufficient capacity in the cluster, and if so, what is the optimal solution to fulfill the upgrade request. To be more specific, this can be that the leader plans to upgrade the N virtual machine deployment at cloud B managed by cluster follower node B 306B to a 2N virtual machine deployment. The leader node can seek a feasibility assessment from all follower orchestration management nodes, such as information about available capacity, estimated cost, etc. Each follower orchestration management node can report to the leader how many new virtual machines can be supported by it given its remaining capacity, at what estimated cost, and other relevant data. In this example, cluster follower node B 306B reports that it has capacity of ⅓ N: cluster follower node C 306C reports that it has capacity of ½ N: and cluster follower node D 306D reports that it has capacity of 1.6 N. After receiving responses from a majority of orchestration management nodes, combined with its own input, the leader node can determine if a feasible solution exists, and determine a subgroup of required orchestration management nodes to execute a (possibly best) solution.

In a Propose phase 312, the leader node, cluster leader node A 304A, can communicate the solution to follower nodes, specify a subgroup 314 of management nodes for the solution (e.g., cluster follower node B 306B and cluster follower node D 306D), and designate one orchestration management node as the leader node 316 (e.g., cluster follower node B 306B) of the defined subgroup 314. It can be that all orchestration management nodes of subgroup 314 must reserve their capacity required by the proposed solution. In this case, that can mean that cluster follower node D 306D (serving as subgroup follower node D 318 in this context) must reserve capacity needed to run the N new virtual machines. If a reservation fails, it can be that cluster follower node D 306D must reject the proposed solution. When a majority of orchestration management nodes agree to the proposed solution (which, in some examples, must include all nodes of the chosen subgroup), the proposed solution can be approved, via commit 320. All orchestration management nodes can then add the proposed solution into their record, via commit sync 322. If the proposed solution is not approved, it can be that all subgroup nodes must release their capacity reserved for the proposed solution. After all votes are collected, the cluster leader node A 304A can send the final agreement, e.g., commit or abort, to all orchestration management nodes.

At this point, the proposed solution can be replicated to all the orchestration management nodes. The multi-cloud configuration can reflect the desired configuration with status of the N new virtual machines showing pending.

The third phase, the commit phase 320, can be handled concurrently, meaning that it can be that only the subgroup of management nodes that are required to scale up from N to 2N new virtual machines are involved in the commit phase 320. The cluster leader and followers can continue to process the next request. In parallel, the designated leader of the chosen subgroup, cluster follower node B 306B, can run the Commit phase consensus protocol among orchestration management nodes of subgroup 314. Formation of a subgroup can be fast, without the need of a group leader election process. This can be because the cluster leader, cluster leader node A 304A, already knows the status and availability of all nodes and therefore can assign a leader directly for efficiency purposes. As a Raft approach, the leader can have a limited time lease as usual, and a new leader can be elected as needed. The subgroup can run one or more regular Raft consensus protocols as needed until the upgrade completes. Whether the upgrade completes successfully or unsuccessfully, the leader node at the time can request that the management cluster leader node, e.g., cluster leader node A 304A, to run a one-phase commit (as part of commit sync 322) protocol to update the final state information. While the status of the upgrade is up to date at the subgroup level, the final status at the cluster level can be updated at the conclusion of the upgrade. In other words, it can eventually be consistent at the cluster level as far as final status is concerned. During an upgrade or other proposed changes, up-to-date status information can be found at the subgroup level. Response 324 can then be sent to client X 302X.

The diagram in signal flow 300 illustrates the inquire-propose-commit-respond four-phase consensus protocol. Signal flow 300 illustrates that the subgroup commit 320 phase completed in one round of message exchange. It can be appreciated that, due a long duration asynchronous nature of multi-cloud orchestration management operations, a subgroup commit phase can take multiple number of round-trip network communications to coordinate until completion. As a result, multiple concurrent subgroup-level commit phases can overlap. Each concurrent subgroup consensus protocol can involve only a subset of management nodes, and therefore interchange a smaller number of messages. Each orchestration management node can be part of multiple subgroup consensus protocols. Management workload can balance out with concurrent subgroup consensus protocols going on in parallel. As a result, a protocol according to the present techniques can have two advantages over other approaches based on a Raft approach, in terms of concurrency and number of messages.

Figure 4:
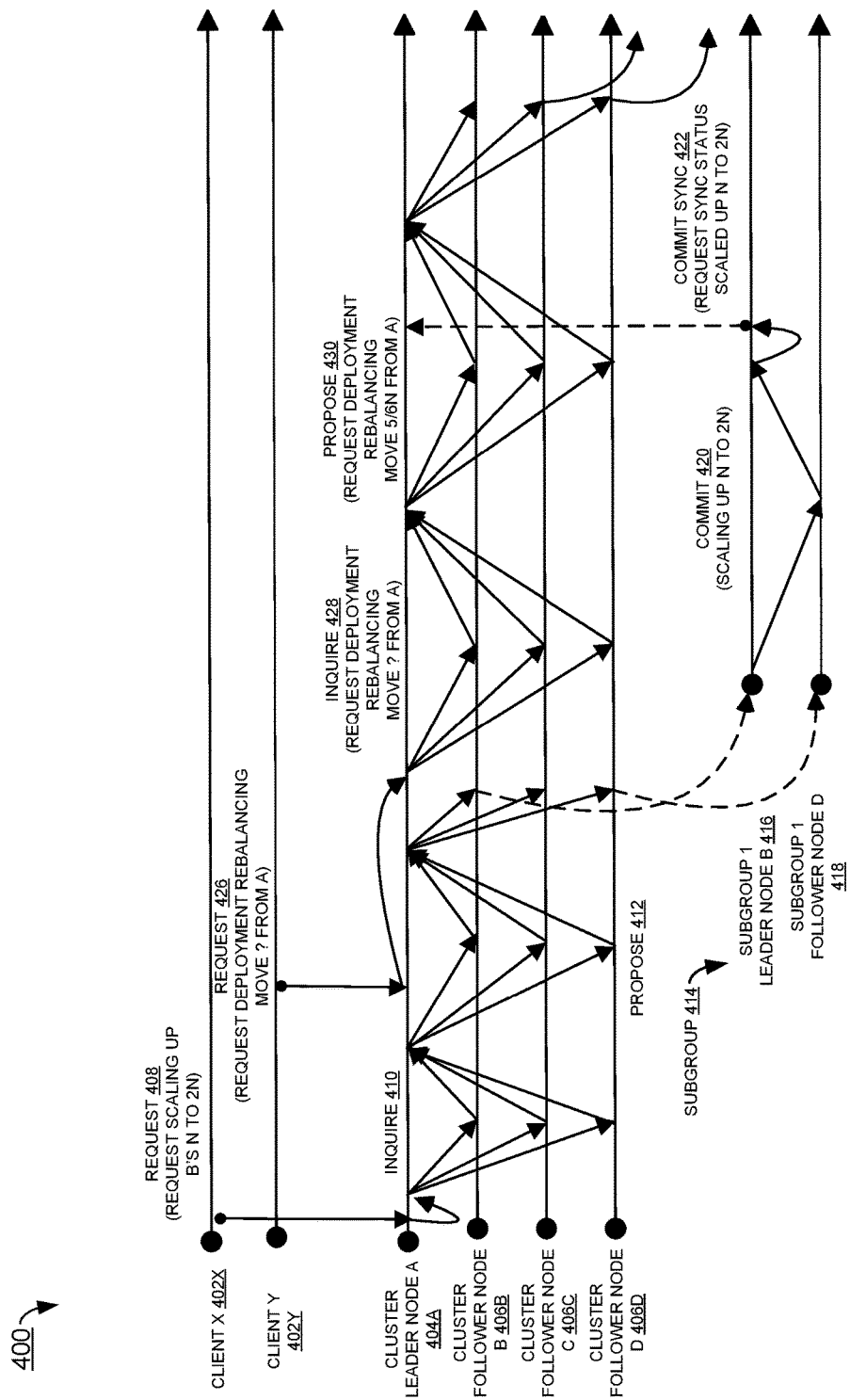
FIG. 4 illustrates another example signal flow that can facilitate distributed and concurrent multi-cloud orchestration management, in accordance with an embodiment of this disclosure.

FIG. 4 illustrates another example signal flow 400 that can facilitate distributed and concurrent multi-cloud orchestration management, in accordance with an embodiment of this disclosure. In some examples, signal flow 400 can be implemented by client computers 106, distributed and concurrent multi-cloud orchestration management component 108, leader management node 110, and/or follower management nodes 112 to facilitate distributed and concurrent multi-cloud orchestration management.

Signal flow 400 illustrates an upgrade request and a workload rebalancing request to show commit phase concurrency. In this example, a second client, Client Y 402Y, sends a deployment rebalancing request 426 to the cluster leader node, cluster leader node A 304A, amid processing a different request—request 408.

The signals of signal flow 400 can be sent between client X 402X and client Y 402Y; cluster leader node A; and cluster follower node B 406B, cluster follower node C 406C, and cluster follower node D 406D. These components can be similar to client X 302X and client Y 302Y; cluster leader node A; and cluster follower node B 306B, cluster follower node C 306C, and cluster follower node D 306D of FIG. 3, respectively. Additionally, subgroup 414, subgroup leader node B 416, subgroup follower node D 418 can be similar to subgroup 314, subgroup leader node B 316, and subgroup follower node D 318.

Additionally, certain signals of signal flow 400 can be similar to those of signal flow 300 of FIG. 3. Request 408, inquire 410, propose 412, commit 420, and commit sync 422 can be similar to request 308, inquire 310, propose 312, commit 320, and commit sync 322, respectively As shown in signal flow 400, the commit phase 420 of request 408 runs in parallel with the inquire 428 phase of request 426 "Move ? from A." Client Y 402Y requests to rebalance a workload on cloud A, e.g., move some workload from cloud A to other clouds if that move can improve operation efficiency and/or cost objectives. In the inquire 428 phase, cluster leader node A 404A receives capacity information along with other operational characteristics data from management nodes. This capacity information can be that cluster follower node B 306B has capacity of ⅓ N: cluster follower node C 406C has capacity of ½ N: and cluster follower node D 406D has capacity of 0.6 N.

In this example, cluster leader node A 404A determines that an optional solution is to move N/3 nodes from cloud A to cloud C, and to move N/2 from cloud A to cloud D. cluster leader node A 404A proposes this solution to all nodes in a subsequent propose 430 phase. In the meantime, subgroup 414 completes the concurrent commit 420 phase and sends a request 422 to cluster leader node A 404A to update the final status to the cluster.

Figure 5:
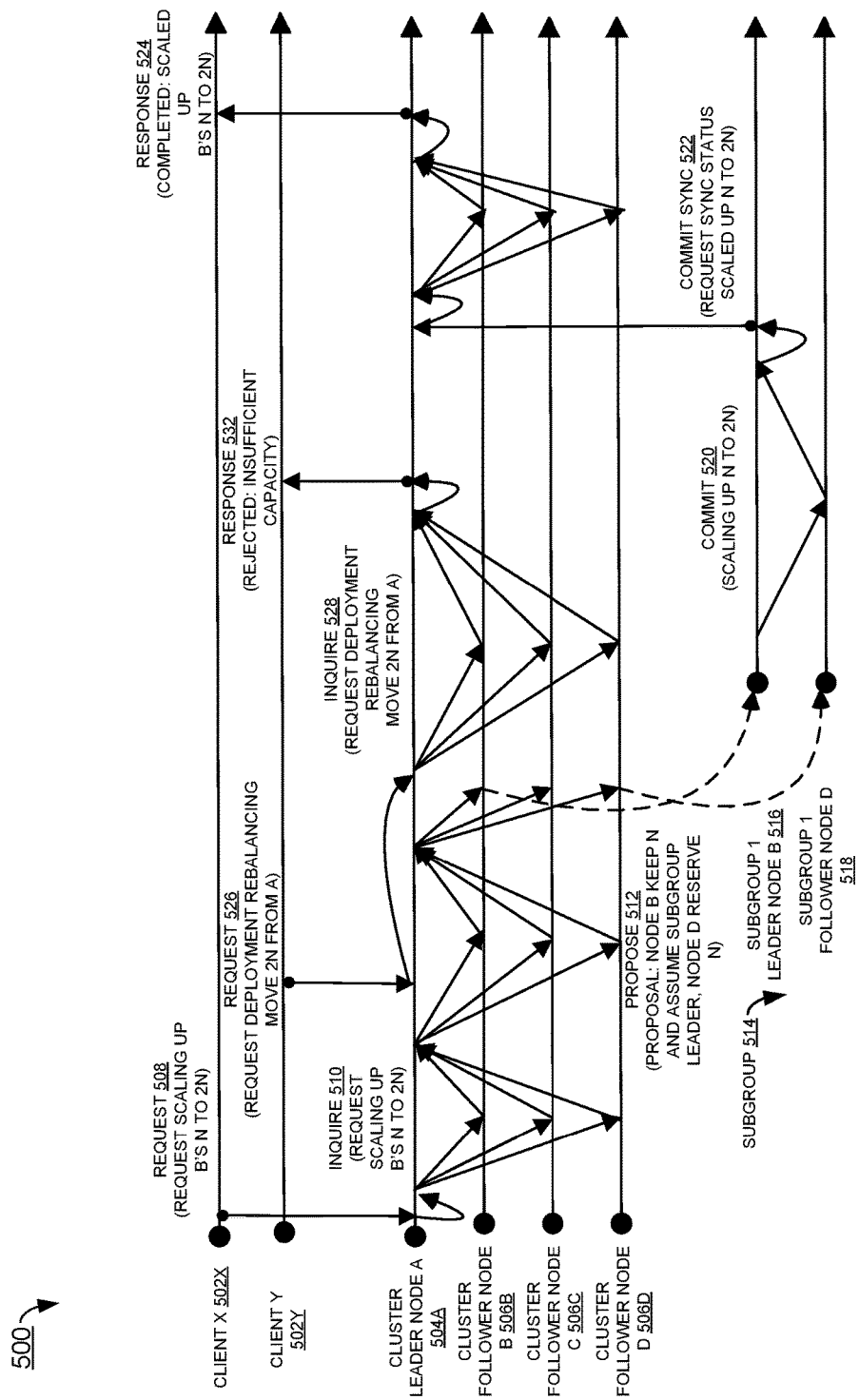
FIG. 5 illustrates another example signal flow that can facilitate distributed and concurrent multi-cloud orchestration management, in accordance with an embodiment of this disclosure.

FIG. 5 illustrates another example signal flow 500 that can facilitate distributed and concurrent multi-cloud orchestration management, in accordance with an embodiment of this disclosure. In some examples, signal flow 500 can be implemented by client computers 106, distributed and concurrent multi-cloud orchestration management component 108, leader management node 110, and/or follower management nodes 112 to facilitate distributed and concurrent multi-cloud orchestration management.

Signal flow 500 illustrates how a distributed orchestration management protocol can handle resource contention that results in a request rejection. Client Y 502Y can request to move N nodes away from cloud A to other clouds, and not merely move some nodes from cloud A to other clouds. It can be clear that, after N nodes are reserved in the propose 512 phase of request 508, there is insufficient capacity remaining in the multi-cloud environment. This can become clear in the inquire 528 phase of request 526 that cluster leader node A 504A concludes there is not a feasible solution to satisfy client Y's 502Y request and thus rejects the request. The protocol can complete upon completion of the inquire 528 phase. It can be that there is no need to run through the propose and commit phases (as indicated by response 532). This example can show an advantage of having an initial inquire (e.g., inquire 510) phase gather up to date capacity, cost and other status information from management nodes (e.g., cluster follower node B 506B, cluster follower node C 506C, and cluster follower node D 506D), and then reserve the required resources required by an optimal solution in the propose (e.g., propose 512) phase with agreement from resource owner nodes and a majority of all management nodes. An orchestration management protocol according to the present techniques can have an advantage of avoiding resource contention caused deadlocks, and improving protocol efficiency relative to prior approaches.

The signals of signal flow 500 can be sent between client X 502X and client Y 502Y; cluster leader node A: and cluster follower node B 506B, cluster follower node C 506C, and cluster follower node D 506D. These components can be similar to client X 402X and client Y 402Y; cluster leader node A; and cluster follower node B 406B, cluster follower node C 406C, and cluster follower node D 406D of FIG. 4, respectively. Additionally, subgroup 514, subgroup leader node B 516, subgroup follower node D 518 can be similar to subgroup 414, subgroup leader node B 416, and subgroup follower node D 418.

Additionally, certain signals of signal flow 500 can be similar to those of signal flow 300 of FIG. 3, and/or signal flow 400 of FIG. 4. Request 508, inquire 510, propose 512, commit 520, commit sync 522, and response 524 can be similar to request 308, inquire 310, propose 312, commit 320, commit sync 322, and response 324, respectively. Request 526 and inquire 528 can be similar to request 426 and inquire 428. Response 532 can be similar to response 324, where response 532 indicates that the corresponding request is rejected for insufficient capacity, while response 324 indicates that the request has been completed.

As shown in signal flow 500, subgroup 514 nodes can maintain the status during a commit phase. The subgroup leader node (e.g., subgroup leader node B 516) can send a status update request to the cluster group leader (e.g., cluster leader node A 504A) upon completion of the commit phase (e.g., commit sync 522). The cluster leader node can then run a single commit (e.g., as part of commit sync 522) phase protocol to request management nodes to update the commit state. A status of the reserved N nodes can be changed from pending to running—that is, the final state can be replicated to all management nodes. Then the leader node can send a response (e.g., response 524) to client X 502X to inform client X 502X that the upgrade request has complemented successfully. In some examples, there can be multiple ways to send responses to requesters. Where a subgroup level commit phase fails, this cluster level commit phase can update the final status accordingly.

Figure 6:
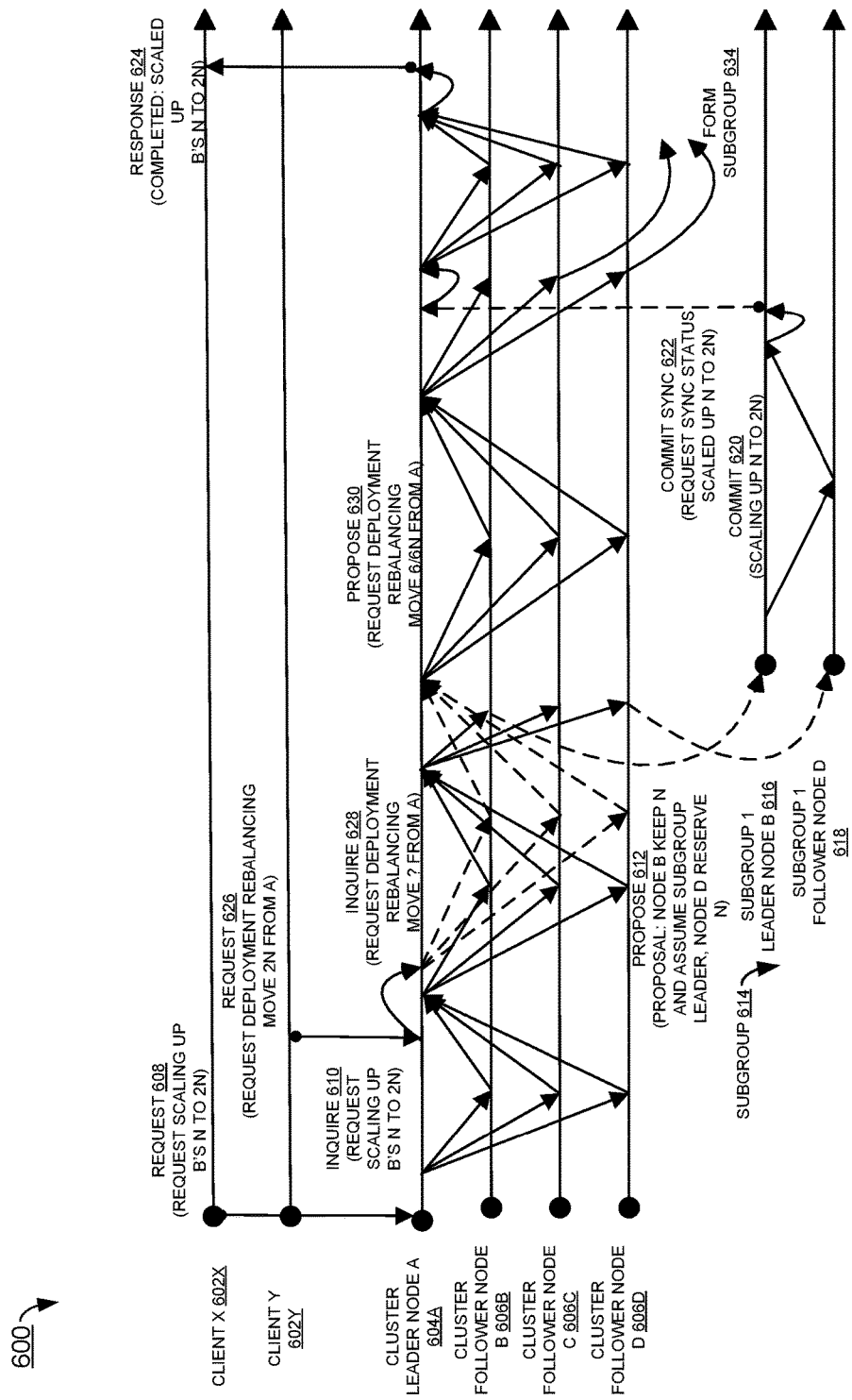
FIG. 6 illustrates another example signal flow that can facilitate distributed and concurrent multi-cloud orchestration management, in accordance with an embodiment of this disclosure.

FIG. 6 illustrates another example signal flow 600 that can facilitate distributed and concurrent multi-cloud orchestration management, in accordance with an embodiment of this disclosure. In some examples, signal flow 600 can be implemented by client computers 106, distributed and concurrent multi-cloud orchestration management component 108, leader management node 110, and/or follower management nodes 112 to facilitate distributed and concurrent multi-cloud orchestration management.

The example of FIG. 6 can generally be considered an "optimistic" approach to resource allocation, while the examples of FIGS. 3-5 can then be contrasted as a "conservative" approach. In an optimistic approach, a second propose phase for a second request can begin before starting a commit phase on a prior request. This can sometimes lead to resource-contention-based deadlock, while also offering a possibility of greater concurrency. In a conservative approach, a second propose phase for a second request can begin after starting a commit phase on a prior request, and before that commit phase completes.

Resource contention can happen when a cluster reaches maximum capacity. An approach can be taken to further increase concurrency of the inquire-propose-commit-respond four-phase protocol. Shown in signal flow 600 is a successful case of achieving maximum concurrency. In this approach, the inquire (e.g., inquire 628 that corresponds to request 628)) phase can overlap with a phase of other requests (e.g., commit 620 that corresponds to request 608), and the reported capacity can be overestimated, and not reflect the actual cluster capacity accurately. In the case where resource contention does occur, as shown in signal flow 500 of FIG. 5, a request can be rejected and all reserved resources can be released and free of deadlock conditions. The multi-cloud orchestration management protocol can retry the failed request.

The signals of signal flow 600 can be sent between client X 602X and client Y 602Y; cluster leader node A; and cluster follower node B 606B, cluster follower node C 606C, and cluster follower node D 606D. These components can be similar to client X 502X and client Y 502Y; cluster leader node A; and cluster follower node B 506B, cluster follower node C 506C, and cluster follower node D 506D of FIG. 5, respectively. Additionally, subgroup 614, subgroup leader node B 616, subgroup follower node D 618 can be similar to subgroup 514, subgroup leader node B 516, and subgroup follower node D 518.

Additionally, certain signals of signal flow 600 can be similar to those of signal flow 400 of FIG. 4 and/or signal flow 500 of FIG. 5. Request 608, inquire 610, propose 612, commit 620, request 626, and inquire 628, can be similar to request 508, inquire 510, propose 512, commit 520, request 526, and inquire 528, respectively. Response 624 and response 632 can be similar to instances of response 324 of FIG. 3. Request 626, inquire 628, and propose 630) can be similar to request 426, inquire 428, and propose 430. Form subgroup 634 can be similar to forming subgroup 614 as part of processing request 608, and can be performed as part of processing request 626.

Example Process Flows

FIG. 7 illustrates an example process flow 700 that can facilitate distributed and concurrent multi-cloud orchestration management, in accordance with an embodiment of this disclosure. In some examples, one or more embodiments of process flow 700 can be implemented by distributed and concurrent multi-cloud orchestration management component 107 of FIG. 1, or computing environment 1200 of FIG. 12.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 800 of FIG. 8, process flow 900 of FIG. 9, process flow 1000 of FIG. 10, and/or process flow 1100 of FIG. 11.

Process flow 700 begins with 702, and moves to operation 704.

Operation 704 depicts receiving a request from a client to perform a job via a multi-cloud platform at a leader management node that is configured to create proposals for allocation of computing resources via the multi-cloud platform. In some examples, the request can be similar to request 324 of FIG. 3, and received by leader management node 110 of FIG. 1. The request can be to perform a job in a multi-cloud scenario.

In some examples, a job can comprise allocating new virtual machine nodes for a particular client. In another example, a client can desire to upgrade an operating system across multiple clouds in different regions. A constraint can be that at most 5% of devices can be upgraded during peak hours, and at most 25% of devices can be upgraded during off-peak hours. In an inquire phase, management nodes can report how many devices they have, and a range of upgrade time needed per device model they possess. The leader management node can determine a plan of percentage of devices to be upgraded per cloud, and send that plan in the propose phase. A subgroup can be formed for management nodes that have such devices, and the management nodes can start upgrading according to the plan, while working in parallel and in tandem to adhere to the constraints.

In another example, a client can desire to increase a distributed database storage size, and also add additional database server nodes. This job can involve sharding reconfiguration, and data replications and movements. In an inquire phase, management nodes can report available storage nodes and input/output (I/O) bandwidth. In a propose phase, the leader management node can outline storage node selection and storage size allocation. In a commit phase, involved management nodes can coordinate to add database server and storage capacity, and then coordinate configuration changes and data transfer while keeping the database fully operational during the job.

In another example, a client can desire to move old data from higher-speed data storage to more economical storage—that is, a form of archiving data. This can involve moving older data from distributed data storage to three archiving sites. A constraint can be that transferring old data out of a site should not exceed 2% of overall data I/O bandwidth, and an archive site has a maximum 500 MB per second inflow data bandwidth. In an inquire phase, management nodes can report how much old data they have to archive. In a propose phase, the leader management node can lay out a plan for bandwidth allocation, including both for the source site and the destination site, and allocate archiving storage.

After operation 704, process flow 700 moves to operation 706.

Operation 706 depicts, based on receiving the request, sending respective first inquiries to respective management nodes of a group of management nodes, where the respective management nodes are configured to manage respective cloud platforms of the multi-cloud platform, where the respective first inquiries inquire about respective available processing resources of the respective cloud platforms to perform the job. In some examples, the first inquiries can be similar to inquire 310 and can be sent from leader management node 110 of FIG. 1 to follower management nodes 112. That is, it can be that a leader performs an inquire phase with all other management nodes.

After operation 706, process flow 700 moves to operation 708.

Operation 708 depicts, based on receiving respective responses from the respective management nodes, determining a first proposal for reservation of computing resources for the request among the respective cloud platforms. This can be a propose phase similar to propose 312 of FIG. 3.

In some examples, the respective responses from the respective management nodes indicate respective configuration and state information of the respective cloud platforms. That is, in an inquire phase, a leader node can request configuration and state information from all management nodes with respect to the request.

In some examples, operation 708 comprises determining that the first proposal satisfies a defined optimality criterion. That is, in an inquire phase, a leader node can request configuration and state information from all management nodes with respect to the request. Then the leader node can determine an optimal solution (or one that satisfies a metric of optimality or efficiency though it is not the optimal solution) with the data.

In some examples, operation 708 comprises sending the first proposal for the reservation of the computing resources, where the first proposal indicates a commit request to reserve respective computing resources of the computing resources among a subgroup of the group of management nodes that includes the subgroup leader. That is, as part of a propose phase, a leader node can send the proposal to all management nodes specified in the solution, where the proposal requests that the management nodes reserve the required resources to implement the solution.

In some examples, operation 708 comprises, in response to sending the first proposal for the reservation of the computing resources to the respective management nodes, determining that a number of management nodes that indicate agreement to the first proposal satisfies a defined threshold criterion. That is, in response to the leader management node sending the proposal to the management nodes that are specified in the solution, the management nodes can respond to the leader management node with an acknowledgement of agreement with the solution and with having reserved the indicated resources.

In some examples, the determining that the number of management nodes that indicate agreement to the first proposal satisfies the defined threshold criterion indicates that the computing resources are reserved across a subgroup of the group of management nodes that includes the subgroup leader. That is, the propose phase can permit the leader management node to ensure that all required resources are reserved. This can help avoid a deadlock situation caused by resource contention. In some examples, the defined threshold criterion can be that a simple majority of group members approve the proposal, and that all resources are allocated by the selected subgroup of management nodes.

After operation 708, process flow 700 moves to operation 710.

Operation 710 depicts selecting a subgroup leader node from the group of management nodes, where the subgroup leader node is configured to perform a commit operation for the reservation of the computing resources in parallel with the leader management node sending respective second inquiries to the respective management nodes and determining a second proposal. Using the example of FIG. 4, this can comprise cluster leader node A selecting the nodes for subgroup 414, and delegating commit 420 to them. Continuing with this example, this can also comprise cluster leader node A 404A initiating inquire 428 for another request (request 426) before commit 420 is completed.

In some examples, the subgroup leader node is configured to perform the commit operation with a subgroup of management nodes of the group of management nodes. In some examples, operation 710 comprises disassembling the subgroup of management nodes in response to the commit operation being completed. That is, in some examples, concurrency in a commit phase can be achieved by forming a subgroup of only those management nodes that are specified in the solution. This subgroup of management nodes can run a process to manage consistent subgroup state with a purpose of completing the commit phase. The subgroup can be disassembled upon completion of the commit phase.

In some examples, communications about the commit operation are contained within the subgroup of management nodes while performing the commit operation, and until the subgroup of management nodes completes the commit operations. That is, it can be that a commit phase protocol involves only a subset of management nodes, which therefore can reduce a number of messages to be transmitted as compared to performing a commit among the entire group of management nodes (which is larger than the subgroup).

In some examples where the respective management nodes are respective first management nodes, operation 710 comprises determining respective up or down statuses of the respective management nodes based on receiving respective responses to the first proposal from the respective management nodes, where a subgroup is formed from respective second management nodes of the group of management nodes that have the up status, where the subgroup leader is selected from the respective second management nodes, and where the subgroup leader is selected independently of a leader-election protocol. That is, a cluster leader can be assigned as a leader when forming a subgroup for efficiency purposes. This can be possible because the leader node knows the status of each management node at the end of a propose phase.

After operation 710, process flow 700 moves to 712, where process flow 700 ends.

FIG. 8 illustrates an example process flow 800 that can facilitate distributed and concurrent multi-cloud orchestration management, in accordance with an embodiment of this disclosure. In some examples, one or more embodiments of process flow 800 can be implemented by distributed and concurrent multi-cloud orchestration management component 108 of FIG. 1, or computing environment 1200 of FIG. 12.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 700 of FIG. 7, process flow 900 of FIG. 9, process flow 1000 of FIG. 10, and/or process flow 1100 of FIG. 11.

Process flow 800 begins with 802, and moves to operation 804.

Operation 804 depicts receiving a request from a client to perform a task. In some examples, operation 804 can be performed in a similar manner as operation 704 of FIG. 7.

After operation 804, process flow 800 moves to operation 806.

Operation 806 depicts, based on receiving the request, sending respective first inquiries to respective management nodes of a group of management nodes, where the respective first inquiries inquire about respective available processing resources of respective cloud platforms of a multi-cloud platform to perform the task. In some examples, operation 806 can be performed in a similar manner as operation 706 of FIG. 7.

After operation 806, process flow 800 moves to operation 808.

Operation 808 depicts, based on receiving respective responses from the respective management nodes, determining a first proposal for reservation of computing resources for the request among the respective cloud platforms. In some examples, operation 808 can be performed in a similar manner as operation 708 of FIG. 7.

After operation 808, process flow 800 moves to operation 810.

Operation 810 depicts selecting a subgroup leader node from the group of management nodes, where the subgroup leader node is configured to perform a commit operation for the reservation of the computing resources in parallel with the system sending respective second inquiries to the respective management nodes and determining a second proposal. In some examples, operation 810 can be performed in a similar manner as operation 710 of FIG. 7.

In some examples, operation 810 comprises committing a status update that corresponds to the request based on an indication received from the subgroup leader node regarding a status of performing the commit operation, and where the indication received from the subgroup leader node corresponds to a single propose phase. That is, a status update can be committed from a subgroup to the greater cluster as part of a single propose phase.

After operation 810, process flow 800 moves to 812, where process flow 800 ends.

FIG. 9 illustrates an example process flow 900 that can facilitate distributed and concurrent multi-cloud orchestration management, in accordance with an embodiment of this disclosure. In some examples, one or more embodiments of process flow 900 can be implemented by distributed and concurrent multi-cloud orchestration management component 109 of FIG. 1, or computing environment 1200 of FIG. 12.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 700 of FIG. 7, process flow 800 of FIG. 8, process flow 1000 of FIG. 10, and/or process flow 1100 of FIG. 11.

Process flow 900 begins with 902, and moves to operation 904.

Operation 904 depicts receiving a second request to perform a second task, where the second request is received before the subgroup leader begins to perform the commit operation. Using the example of FIG. 4, the second request can be request 426 while the commit operation can be commit 420.

After operation 904, process flow 900 moves to operation 906.

Operation 906 depicts sending the respective second inquiries after the subgroup leader begins to perform the commit operation, where the second request corresponds to the respective second inquiries. Continuing with the example of FIG. 4, inquire 428 can be performed after commit 420 starts. This can be classified as a conservative approach, and implemented to avoid resource contention between two requests.

After operation 906, process flow 900 moves to 908, where process flow 900 ends.

Figure 10:
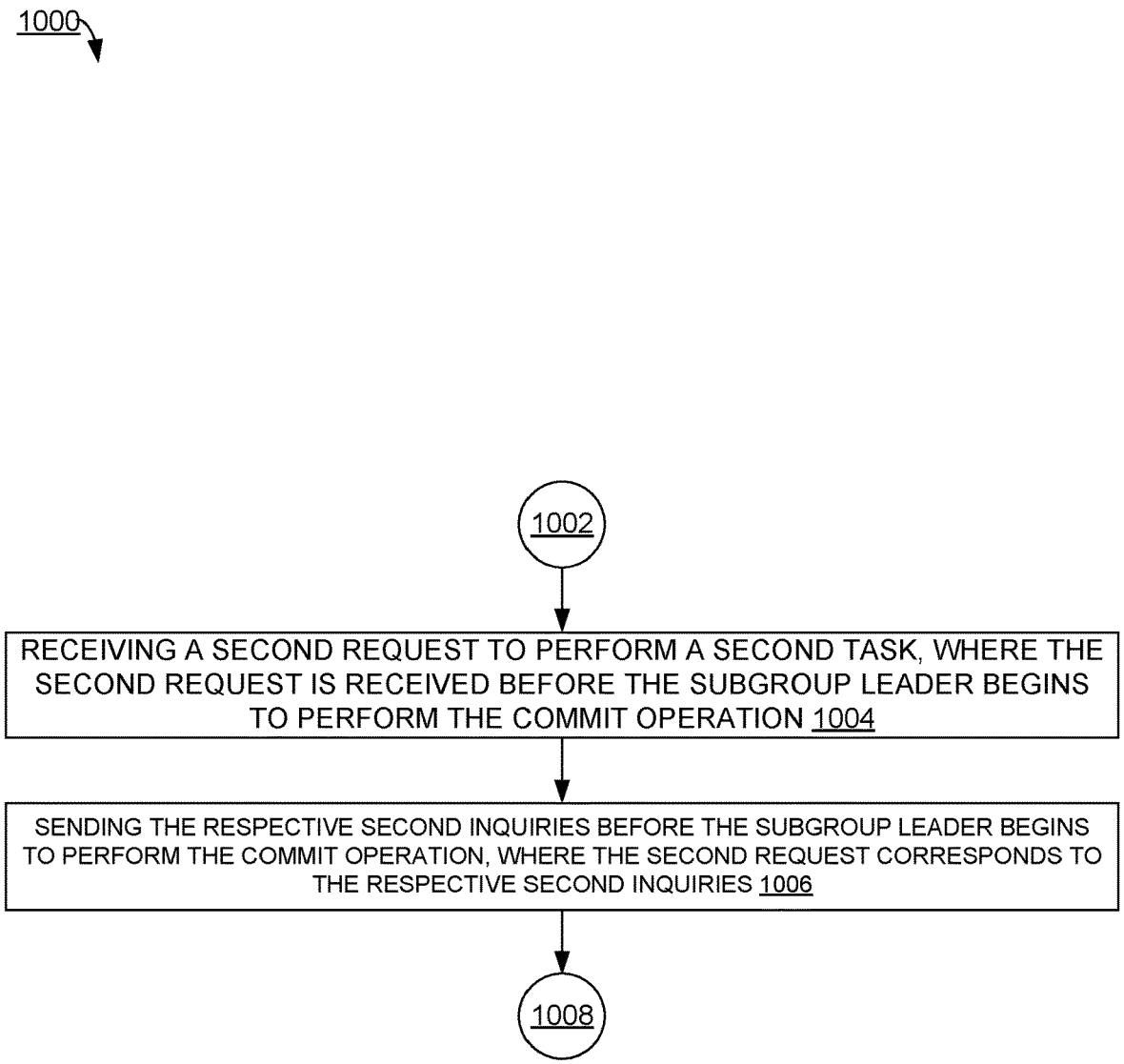
FIG. 10 illustrates another example process flow that can facilitate distributed and concurrent multi-cloud orchestration management, in accordance with an embodiment of this disclosure.

FIG. 10 illustrates an example process flow 1000 that can facilitate distributed and concurrent multi-cloud orchestration management, in accordance with an embodiment of this disclosure. In some examples, one or more embodiments of process flow 1000 can be implemented by distributed and concurrent multi-cloud orchestration management component 1010 of FIG. 1, or computing environment 1200 of FIG. 12.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 700 of FIG. 7, process flow 800 of FIG. 8, process flow 900 of FIG. 9, and/or process flow 1100 of FIG. 11.

Process flow 1000 begins with 1002, and moves to operation 1004.

Operation 1004 depicts receiving a second request to perform a second task, where the second request is received before the subgroup leader begins to perform the commit operation. In some examples, operation 1004 can be performed in a similar manner as operation 904 of FIG. 9.

After operation 1004, process flow 1000 moves to operation 1006.

Operation 1006 depicts sending the respective second inquiries before the subgroup leader begins to perform the commit operation, where the second request corresponds to the respective second inquiries. Using the example of FIG. 6, the second inquiry can be inquire 628, and that can begin before commit 620 begins. This can be classified as an optimistic approach, where it can work faster than the conservative approach of FIG. 9, while carrying a higher risk of resource contention-based deadlock between multiple requests.

After operation 1006, process flow 1000 moves to 1008, where process flow 1000 ends.

Figure 11:
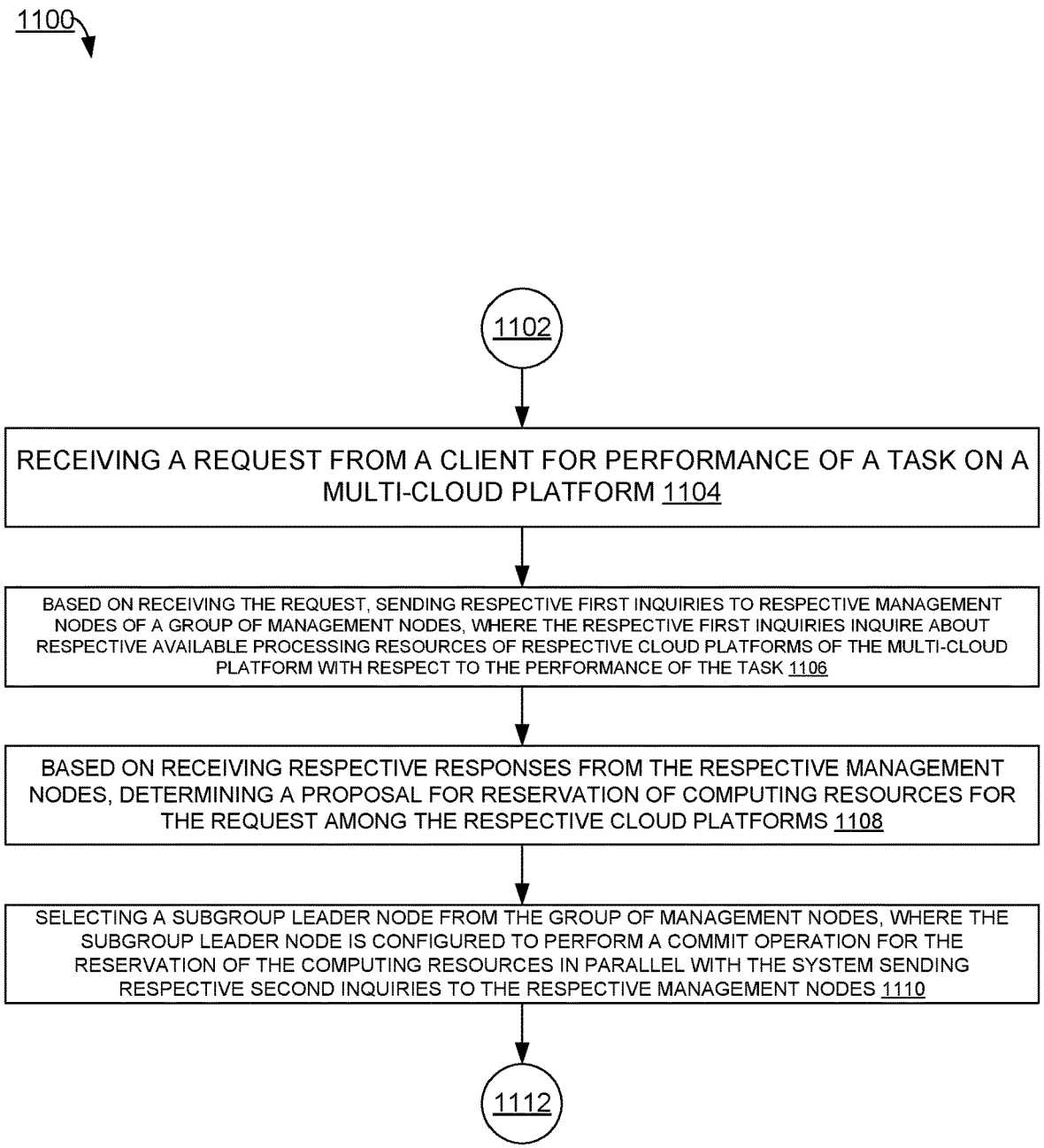
FIG. 11 illustrates another example process flow that can facilitate distributed and concurrent multi-cloud orchestration management, in accordance with an embodiment of this disclosure.

FIG. 11 illustrates an example process flow 1100 that can facilitate distributed and concurrent multi-cloud orchestration management, in accordance with an embodiment of this disclosure. In some examples, one or more embodiments of process flow 1100 can be implemented by distributed and concurrent multi-cloud orchestration management component 1111 of FIG. 1, or computing environment 1200 of FIG. 12.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 700 of FIG. 7, process flow 800 of FIG. 8, process flow 900 of FIG. 9, and/or process flow 1000 of FIG. 10.

Process flow 1100 begins with 1102, and moves to operation 1104.

Operation 1104 depicts receiving a request from a client for performance of a task on a multi-cloud platform. In some examples, operation 1104 can be performed in a similar manner as operation 704 of FIG. 7.

After operation 1104, process flow 1100 moves to operation 1106.

Operation 1106 depicts, based on receiving the request, sending respective first inquiries to respective management nodes of a group of management nodes, where the respective first inquiries inquire about respective available processing resources of respective cloud platforms of the multi-cloud platform with respect to the performance of the task. In some examples, operation 1106 can be performed in a similar manner as operation 706 of FIG. 7.

In some examples, the respective management nodes reserve the respective available processing resources in response to receiving the respective first inquiries. That is, resource reservation can be made during an inquire phase.

In some examples, operation 1106 comprises determining an amount of processing resources sufficient to perform the task, where the respective management nodes reserve the respective available processing resources in response to receiving the respective first inquiries, and where a total of the respective available processing resources exceeds the amount of processing resources sufficient to perform the task. That is, in some examples, maximum concurrency can be achieved through optimistic resource reservation during the inquire phase.

In some examples where the request is a first request, operation 1106 comprises determining a status of resource contention between the first request and a second request based on receiving the respective responses from the respective management nodes. That is, resource contention can be determined in an inquire phase, and resource request processing can complete in a single phase.

In some examples, the present techniques can be implemented to facilitate avoiding resource contention. This can be done where a second request is processed after a first request has reserved required resources (e.g., after the first request starts a commit phase). In other examples, the first and second requests can compete for resources by, e.g., starting to process the second request while the first request is in a proposal phase.

After operation 1106, process flow 1100 moves to operation 1108.

Operation 1108 depicts, based on receiving respective responses from the respective management nodes, determining a proposal for reservation of computing resources for the request among the respective cloud platforms. In some examples, operation 1108 can be performed in a similar manner as operation 708 of FIG. 7.

In some examples, the respective responses indicate respective available computing capacity of the respective cloud platforms, or estimated costs of using resources of the respective cloud platforms.

After operation 1108, process flow 1100 moves to operation 1110.

Operation 1110 depicts selecting a subgroup leader node from the group of management nodes, where the subgroup leader node is configured to perform a commit operation for the reservation of the computing resources in parallel with the system sending respective second inquiries to the respective management nodes. In some examples, operation 1110 can be performed in a similar manner as operation 710 of FIG. 7.

In some examples where the commit operation is a first commit operation, operation 1110 comprises, after the subgroup leader completes the first commit operation, where the first commit operation is performed for a subgroup of the management nodes, receiving an indication of a result of completing the first commit operation, and performing a second commit operation among all of the management nodes. That is, a commit operation performed by a subgroup at the conclusion can merge back to the main group with a successful or failure result. Main group members can then commit the final result. Put another way, at the conclusion of a subgroup commit processing, the subgroup leader of that time can request that the leader of the main group runs a committed phase for all management nodes to commit the final result.

After operation 1110, process flow 1100 moves to 1112, where process flow 1100 ends.

Example Operating Environment

In order to provide additional context for various embodiments described herein, FIG. 12 and the following discussion are intended to provide a brief, general description of a suitable computing environment 1200 in which the various embodiments of the embodiment described herein can be implemented.

For example, parts of computing environment 1200 can be used to implement one or more embodiments of cluster 102 and/or client computers 106 of FIG. 1.

In some examples, computing environment 1200 can implement one or more embodiments of the process flows of FIGS. 7-11 to facilitate distributed and concurrent multi-cloud orchestration management.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a nonvolatile storage such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors: single-processors with software multithread execution capability: multi-core processors: multi-core processors with software multithread execution capability: multi-core processors with hardware multithread technology: parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A: X employs B: or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory coupled to the processor, comprising instructions that, in response to execution by the processor, cause the system to perform operations, comprising:
   receiving a request from a client to perform a job via a multi-cloud platform at a leader management node that is configured to create proposals for allocation of computing resources via the multi-cloud platform;
   based on receiving the request, sending respective first inquiries to respective management nodes of a group of management nodes, wherein the respective management nodes are configured to manage respective cloud platforms of the multi-cloud platform, wherein the respective first inquiries inquire about respective available processing resources of the respective cloud platforms to perform the job;
   based on receiving respective responses from the respective management nodes, determining a first proposal for reservation of computing resources for the request among the respective cloud platforms; and
   selecting a subgroup leader node from the group of management nodes, wherein the subgroup leader node is configured to perform a commit operation for the reservation of the computing resources in parallel with the leader management node sending respective second inquiries to the respective management nodes and determining a second proposal.

2. The system of claim 1, wherein the respective responses from the respective management nodes indicate respective configuration and state information of the respective cloud platforms.

3. The system of claim 1, wherein the operations further comprise:
   determining that the first proposal satisfies a defined optimality criterion.

4. The system of claim 1, wherein the operations further comprise:
   sending the first proposal for the reservation of the computing resources, wherein the first proposal indicates a commit request to reserve respective computing resources of the computing resources among a subgroup of the group of management nodes that includes the subgroup leader.

5. The system of claim 1, wherein the operations further comprise:
   in response to sending the first proposal for the reservation of the computing resources to the respective management nodes, determining that a number of management nodes that indicate agreement to the first proposal satisfies a defined threshold criterion.

6. The system of claim 5, wherein the determining that the number of management nodes that indicate agreement to the first proposal satisfies the defined threshold criterion indicates that the computing resources are reserved across a subgroup of the group of management nodes that includes the subgroup leader.

7. The system of claim 1, wherein the subgroup leader node is configured to perform the commit operation with a subgroup of management nodes of the group of management nodes.

8. The system of claim 7, wherein the operations further comprise:
disassembling the subgroup of management nodes in response to the commit operation being completed.

9. The system of claim 7, wherein communications about the commit operation are contained within the subgroup of management nodes while performing the commit operation, and until the subgroup of management nodes completes the commit operations.

10. The system of claim 1, wherein the respective management nodes are respective first management nodes, and wherein the operations further comprise:
determining respective up or down statuses of the respective management nodes based on receiving respective responses to the first proposal from the respective management nodes, wherein a subgroup is formed from respective second management nodes of the group of management nodes that have the up status, wherein the subgroup leader is selected from the respective second management nodes, and wherein the subgroup leader is selected independently of a leader-election protocol.

11. A method, comprising:
receiving, by a system comprising a processor, a request from a client to perform a task;
based on receiving the request, sending, by the system, respective first inquiries to respective management nodes of a group of management nodes, wherein the respective first inquiries inquire about respective available processing resources of respective cloud platforms of a multi-cloud platform to perform the task;
based on receiving respective responses from the respective management nodes, determining, by the system, a first proposal for reservation of computing resources for the request among the respective cloud platforms; and
selecting, by the system, a subgroup leader node from the group of management nodes, wherein the subgroup leader node is configured to perform a commit operation for the reservation of the computing resources in parallel with the system sending respective second inquiries to the respective management nodes and determining a second proposal.

12. The method of claim 11, wherein the request is a first request, and further comprising:
receiving, by the system, a second request to perform a second task, wherein the second request is received before the subgroup leader begins to perform the commit operation; and
sending, by the system, the respective second inquiries after the subgroup leader begins to perform the commit propose operation, wherein the second request corresponds to the respective second inquiries.

13. The method of claim 11, wherein the request is a first request, and further comprising:
receiving, by the system, a second request to perform a second task, wherein the second request is received before the subgroup leader begins to perform the commit operation; and
sending, by the system, the respective second inquiries before the subgroup leader begins to perform the commit operation, wherein the second request corresponds to the respective second inquiries.

14. The method of claim 11, further comprising:
committing a status update that corresponds to the request based on an indication received from the subgroup leader node regarding a status of performing the commit operation, and wherein the indication received from the subgroup leader node corresponds to a single propose phase.

15. A non-transitory computer-readable medium comprising instructions that, in response to execution, cause a system comprising a processor to perform operations, comprising:
receiving a request from a client for performance of a task on a multi-cloud platform;
based on receiving the request, sending respective first inquiries to respective management nodes of a group of management nodes, wherein the respective first inquiries inquire about respective available processing resources of respective cloud platforms of the multi-cloud platform with respect to the performance of the task;
based on receiving respective responses from the respective management nodes, determining a proposal for reservation of computing resources for the request among the respective cloud platforms; and
selecting a subgroup leader node from the group of management nodes, wherein the subgroup leader node is configured to perform a commit operation for the reservation of the computing resources in parallel with the system sending respective second inquiries to the respective management nodes.

16. The non-transitory computer-readable medium of claim 15, wherein the respective management nodes reserve the respective available processing resources in response to receiving the respective first inquiries.

17. The non-transitory computer-readable medium of claim 16, wherein the operations further comprise:
determining an amount of processing resources sufficient to perform the task, wherein the respective management nodes reserve the respective available processing resources in response to receiving the respective first inquiries, and wherein a total of the respective available processing resources exceeds the amount of processing resources sufficient to perform the task.

18. The non-transitory computer-readable medium of claim 15, wherein the respective responses indicate respective available computing capacity of the respective cloud platforms, or estimated costs of using resources of the respective cloud platforms.

19. The non-transitory computer-readable medium of claim 15, wherein the request is a first request, and further comprising:
determining, by the system, a status of resource contention between the first request and a second request based on receiving the respective responses from the respective management nodes.

20. The non-transitory computer-readable medium of claim 15, wherein the commit operation is a first commit operation, and wherein the operations further comprise:

after the subgroup leader completes the first commit operation, wherein the first commit operation is performed for a subgroup of the management nodes, receiving an indication of a result of completing the first commit operation; and performing a second commit operation among all of the management nodes.

\* \* \* \* \*